United States Patent
Rajak et al.

(10) Patent No.: US 7,096,231 B2
(45) Date of Patent: Aug. 22, 2006

(54) EXPORT ENGINE WHICH BUILDS RELATIONAL DATABASE DIRECTLY FROM OBJECT MODEL

(75) Inventors: Surendra Kumar Rajak, Annandale, VA (US); Husain Choudhury, Sterling, VA (US)

(73) Assignee: American Management Systems, Inc., Fairfax, VA (US)

(*) Notice: Subject to any disclaimer, the term of this patent is extended or adjusted under 35 U.S.C. 154(b) by 441 days.

(21) Appl. No.: 10/028,443

(22) Filed: Dec. 28, 2001

(65) Prior Publication Data

US 2003/0126152 A1 Jul. 3, 2003

(51) Int. Cl.
  *G06F 17/30* (2006.01)

(52) U.S. Cl. .................. 707/103 R; 707/102; 707/101

(58) Field of Classification Search ............ 707/103 R, 707/1–2, 100–104.1, 103, 103 Y, 103 Z; 711/111
  See application file for complete search history.

(56) References Cited

U.S. PATENT DOCUMENTS

| | | | |
|---|---|---|---|
| 5,499,371 A | * | 3/1996 | Henninger et al. ......... 717/108 |
| 5,809,297 A | * | 9/1998 | Kroenke et al. ............ 707/102 |
| 5,893,108 A | * | 4/1999 | Srinivasan et al. ..... 707/103 R |
| 5,907,846 A | * | 5/1999 | Berner et al. ........... 707/103 R |
| 5,937,410 A | * | 8/1999 | Shen ....................... 707/103 R |
| 6,047,284 A | * | 4/2000 | Owens et al. .................. 707/4 |
| 6,101,502 A | * | 8/2000 | Heubner et al. ........ 707/103 R |
| 6,199,195 B1 | * | 3/2001 | Goodwin et al. ........... 717/104 |
| 6,360,223 B1 | * | 3/2002 | Ng et al. ..................... 707/100 |
| 6,374,252 B1 | * | 4/2002 | Althoff et al. .............. 707/102 |
| 6,374,256 B1 | * | 4/2002 | Ng et al. ................. 707/103 R |
| 6,477,527 B1 | * | 11/2002 | Carey et al. ................... 707/4 |
| 6,529,915 B1 | * | 3/2003 | Owens et al. ........... 707/103 R |
| 6,609,123 B1 | * | 8/2003 | Cazemier et al. .............. 707/4 |
| 2003/0204514 A1 | * | 10/2003 | Owens et al. ............... 707/100 |
| 2005/0149555 A1 | * | 7/2005 | Wang et al. ............ 707/103 R |

* cited by examiner

Primary Examiner—Debbie M. Le
(74) Attorney, Agent, or Firm—Staas & Halsey LLP

(57) ABSTRACT

A computer-implemented export engine automatically extracts selected data directly from an object model via an object query language, automatically builds relational database tables for the extracted data and automatically inserts the extracted data into the tables. The tables with the inserted data are then loaded into a relational database.

8 Claims, 6 Drawing Sheets

EXPORT ENGINE WHICH BUILDS RELATIONAL DATABASE DIRECTLY FROM OBJECT MODEL

CROSS-REFERENCE TO RELATED APPLICATIONS

The present invention is related to U.S. patent application titled "METHOD AND APPARATUS FOR DYNAMICALLY MAINTAINING AND EXECUTING DATA DEFINITIONS AND/OR BUSINESS RULES FOR AN ELECTRONIC PROCUREMENT SYSTEM," Ser. No. 09/788,611, filed Feb. 21, 2001, and which is incorporated herein by reference.

The present invention is related to U.S. patent application titled "METHOD AND APPARATUS FOR INTEGRATING WITH MULTIPLE APPLICATION SYSTEMS," Ser. No. 09/750,295, filed Dec. 29, 2000, and which is incorporated herein by reference.

BACKGROUND OF THE INVENTION

1. Field of the Invention

The present invention is directed to computer-implemented export engine which automatically extracts selected data directly from an object model, and automatically builds a non-object database, such as a relational database, from the extracted data.

2. Description of the Related Art

FIG. 1 is a diagram illustrating the conventional extraction of data by a conventional export engine. Referring now to FIG. 1, a physical database 20 supports an object model 22. Object model 22 might be, for example, an object model for an ecommerce platform 24. In this example, since object model 22 relates to ecommerce, object model 22 might include typical objects used in ecommerce such as a requisition 26a, an order 26b and/or an invoice 26c.

A user interface 28 might be, for example, a graphical user interface (GUI) which allows an end user to view and access object model 22.

Database 20 is a non-object database, such as a relational database. Object model 22 communicates with database 20. In a typical embodiment, database 20 communicates via a query language such as SQL. SQL is a well-known query language for communicating with relational databases. In a typically embodiment, object model 22 does not understand SQL, and instead communicates via an object query language (OQL) which is specifically intended for object-oriented data. As an example, if ecommerce platform 24 is an ARIBA ORMS ecommerce platform, the OQL might be AQL, which is a well known OQL for use with the ARIBA ecommerce platform. An OQL to SQL translation occurs, for example, within ecommerce platform 24. The translation could be tied to the physical implementation of physical database 20. For example, the object requisition 26a might be tied to a Table 1 (not illustrated), a Table 2 (not illustrated) and a Table 3 (not illustrated) in database 20. To access fields within requisition 26a, OQL statements might be sent to object model 22, which sends out elaborate, multi-table SQL to database 20.

A client (not illustrated) that subscribes to, or otherwise has access to, ecommerce platform 24, might need to create its own separate relational database 32 to support analytical reporting and querying over the object oriented views of object model 22. An export engine 34 is used to create database 32. In the example of FIG. 1, database 32 is a staging database used in conjunction with a target database/data warehouse 35.

Unfortunately, a conventional export engine 34 cannot extract data directly from object model 22 to database 32. Generally, export engine 34 cannot perform such a direct extraction since the "object-oriented" format of object model 22 is not easily mapped to the "relational" format of database 32. As a result, export engine 34 directly accesses database 20, which is a relational database, and exports the underlying data for object model 22 from database 20 into database 32, which is also a relational database. For example, INFORMATICA has a product which can extract data directly from a relational database underlying an object model, and then build a target relational database from the extracted data, as shown in FIG. 1.

Therefore, export engine 34 is undesirably dependent on the physical implementation of database 20 underlying object model 22. This dependence causes problems. For example, since an end user views data from object model 22 in an object-oriented format through user interface 28, the end user expects queries to run off object model 22. However, this is not possible with export engine 34 since export engine 34 cannot easily map object model 22 to database 20. Moreover, with export engine 34, if changes are made to database 20, export engine 34 needs to be changed. For example, assume that object requisition 26a is implemented using Table 1 (not illustrated), Table 2 (not illustrated) and Table 3 (not illustrated) in database 20 and is later changed to be implemented using Table 1, Table 2 and Table 4 (not illustrated) in database 20. In this case, export engine 34 must be modified to access the appropriate tables. In addition, if there are changes to object model 22, such as a new field being added to an object or a field type being changed for a field within an object, or a new object model is added, the physical database must be modified. As a result, export engine 34 will also have to be modified.

SUMMARY OF THE INVENTION

It is an aspect of the present invention to provide an export engine which directly extracts data from an object model and builds a non-object database, such as a relational database, from the extracted data.

Aspects of the present invention are achieved by providing a method including (a) automatically extracting data directly from an object model; and (b) automatically translating the extracted data to a non-object format.

Aspects of the present invention are also achieved by providing a method including (a) automatically extracting data directly from an object model; and (b) automatically building a non-object database from the extracted data.

Further, aspects of the present invention are achieved by providing a method including (a) selecting object-oriented data in an object model by a human user; (b) automatically extracting the selected data directly from the object model using an object query language corresponding to the object model; (c) automatically building tables for the extracted data in accordance with metadata for the extracted data, the tables being tables for a target relational database; and (d) automatically inserting the extracted data into the tables using a query language corresponding to the tables and which is different from the object query language.

Aspects of the present invention are also achieved by providing a method including (a) selecting object-oriented data in an object model by a human user via a graphical user interface (GUI); (b) automatically constructing commands in an object query language corresponding to the object model to extract the selected data from the object model; (c) automatically extracting the selected data directly from the object model using the constructed commands; (d) automatically building tables for the extracted data in accordance with metadata for the extracted data, the tables being tables for a target relational database; and (e) automatically inserting the extracted data into the tables using a query language corresponding to the tables and which is different from the object query language.

Moreover, aspects of the present invention are achieved by providing an object model, a relational database, a selection device in which a human user selects data to be extracted from the object model, a computer-implemented engine, and a database management system. The engine automatically extracts the selected data directly from the object model via an object query language, automatically builds relational database tables for the extracted data and automatically inserts the extracted data into the tables. The database management system loads the tables with the inserted data into the relational database.

Aspects of the present invention are further achieved by providing a method including (a) selecting a respective object model from a plurality of object models; (b) automatically exacting data directly from the selected object model; and (c) automatically building a non-object database from the extracted data.

Aspects of the present invention are achieved by providing a method including (a) automatically extracting a first set of data directly from an object model; (b) automatically building a first non-object database from the extracted first set of data; (c) automatically extracting a second set of data directly from the object model; and (d) automatically building a second non-object database from the extracted second set of data.

Aspects of the present invention are further achieved by providing a method including (a) selecting a respective object model from a plurality of object models; (b) automatically extracting a first set of data directly from the selected object model; (c) automatically building a first non-object database from the extracted first set of data; (d) automatically extracting a second set of data directly from the selected object model; and (e) automatically building a second non-object database from the extracted second set of data.

Moreover, aspects of the present invention are achieved by providing an apparatus which includes (a) an object model; (b) a relational database; and (c) a computer-implemented engine which automatically extracts data directly from the object model and loads the extracted data into the database.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Reference will now be made in detail to the present preferred embodiments of the present invention, examples of which are illustrated in the accompanying drawings, wherein like reference numerals refer to like elements throughout.

DETAILED DESCRIPTION OF THE PREFERRED EMBODIMENTS

Figure 1:
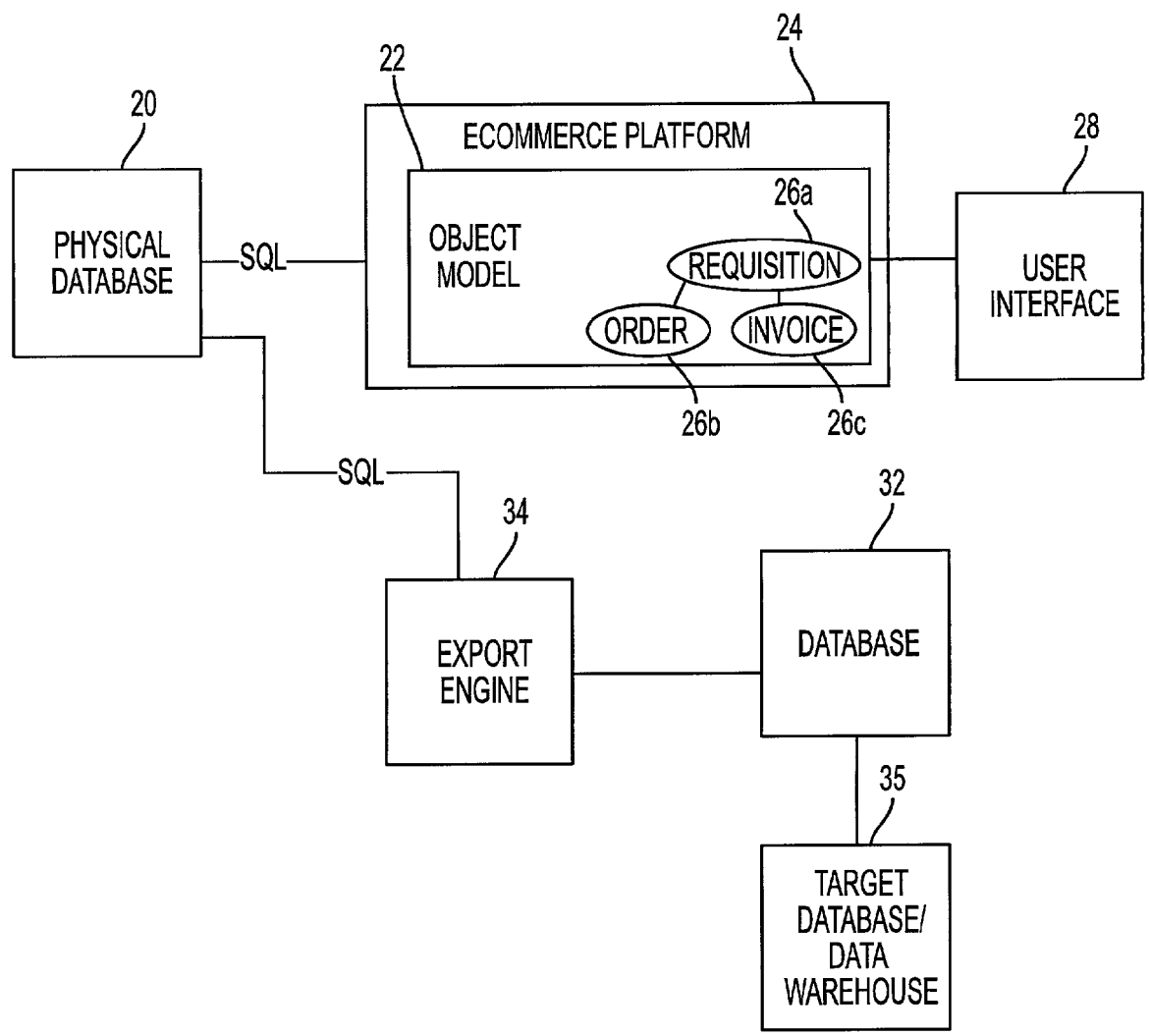
FIG. 1 (prior art) is a diagram illustrating the conventional extraction of data by a conventional export engine.
Figure 2:
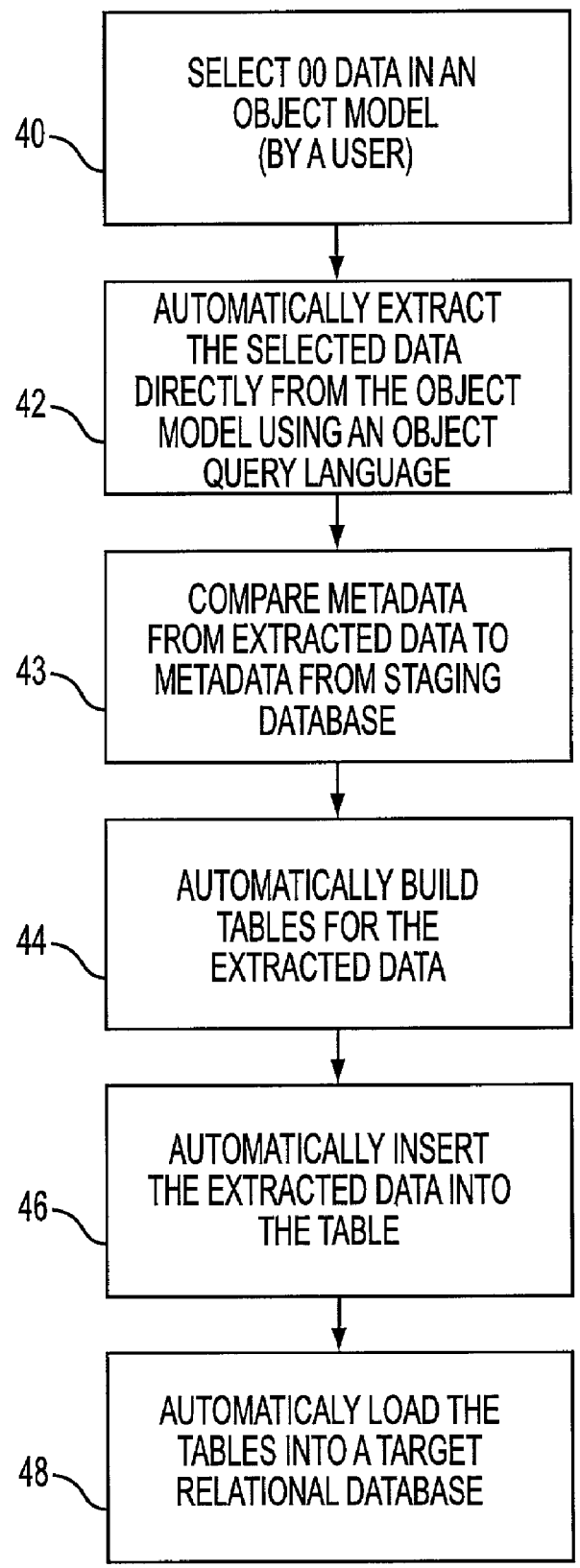
FIG. 2 is a diagram illustrating a process for extracting data directly from an object model to a relational database, according to an embodiment of the present invention.

FIG. 2 is a diagram illustrating a process for extracting data directly from an object model to a relational database, according to an embodiment of the present invention. Referring now to FIG. 2, in operation 40, a human end user selects object-oriented (OO) data in an object model. This selection can be made via a GUI, or by writing appropriate information to control tables, as will be discussed in more detail further below. In many embodiments, the end user would be a "human" end user, but the present invention is not limited in this manner.

From operation 40, the process moves to operation 42, where the selected data is automatically extracted directly from the object model using an object query language corresponding to the object model.

From operation 42, the process moves to operation 43, where the metadata of the extracted data is compared against the metadata of the staging database to determine if tables in the staging database already exist or if the table definitions have been modified.

From operation 43, the process moves to operation 44, where tables for the extracted data are automatically built in accordance with metadata of the extracted data. In the present embodiment, the tables are tables for a staging database.

From operation 44, the process moves to operation 46, where the extracted data is automatically inserted into the tables in the staging database using a query language corresponding to the tables and the staging database, and which is different from the object query language.

From operation 46, the process moves to operation 48, where the tables from the staging database, with the inserted data, are automatically loaded into the target relational database.

In the embodiment in FIG. 2, data from a staging database are loaded into a target database. However, the present invention is not limited to such use of a staging database. Instead, for example, the process can load data directly into a target database without using a staging database as intermediary.

Of course, the overall process in FIG. 2 is only one example of such a process, and many variations are possible.

Figure 3:
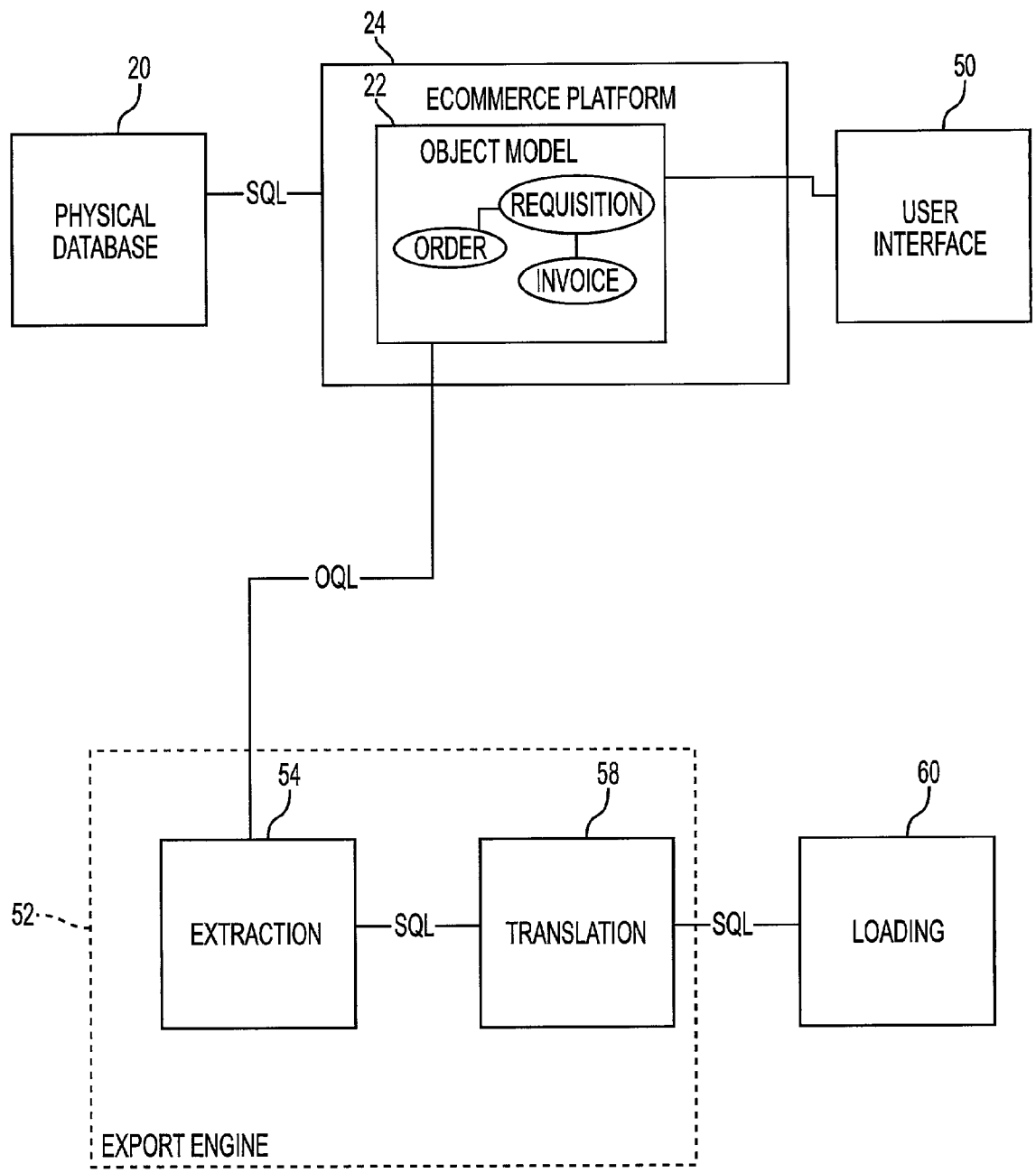
FIG. 3 is a diagram illustrating the extraction of data by an export engine, according to an embodiment of the present invention.

FIG. 3 is a diagram illustrating the extraction of data by an export engine, and is consistent with the process in FIG. 2, according to an embodiment of the present invention. Referring now to FIG. 3, an end user (not illustrated) selects object-oriented data in object model 22 via a user interface 50. User interface 50 might be a GUI, or might simply be control tables into which the end user writes information. The use of a GUI and control tables will be discussed in more detail further below.

An export engine 52 directly accesses object model 22, as opposed to indirectly accessing object model 22 through database 20.

Export engine 52 performs an extraction process 54 in which data is directly extracted from object model 22 using an OQL corresponding to object model 22. For example, if object model 22 is for an ARIBA ecommerce platform, then the OQL might be AQL, which is a well-known OQL for use with an ARIBA ecommerce platform.

After the extraction of data from object model 22, export engine 52 performs a translation process 58 in which the extracted data is translated into a relational database format and stored in a relational, staging database (not illustrated). Since the staging database is a relational database, the translation is performed using a query language corresponding to the staging database. For example, the query language might be SQL.

Thereafter, export engine 52 performs a loading process 60 to load the translated data into a relational, target database (not illustrated). It is well-known how to load data into a relational database. In some embodiments, export engine 52 might directly load the data into a target database, thus eliminating the need for an intermediate, staging database.

Figure 4:
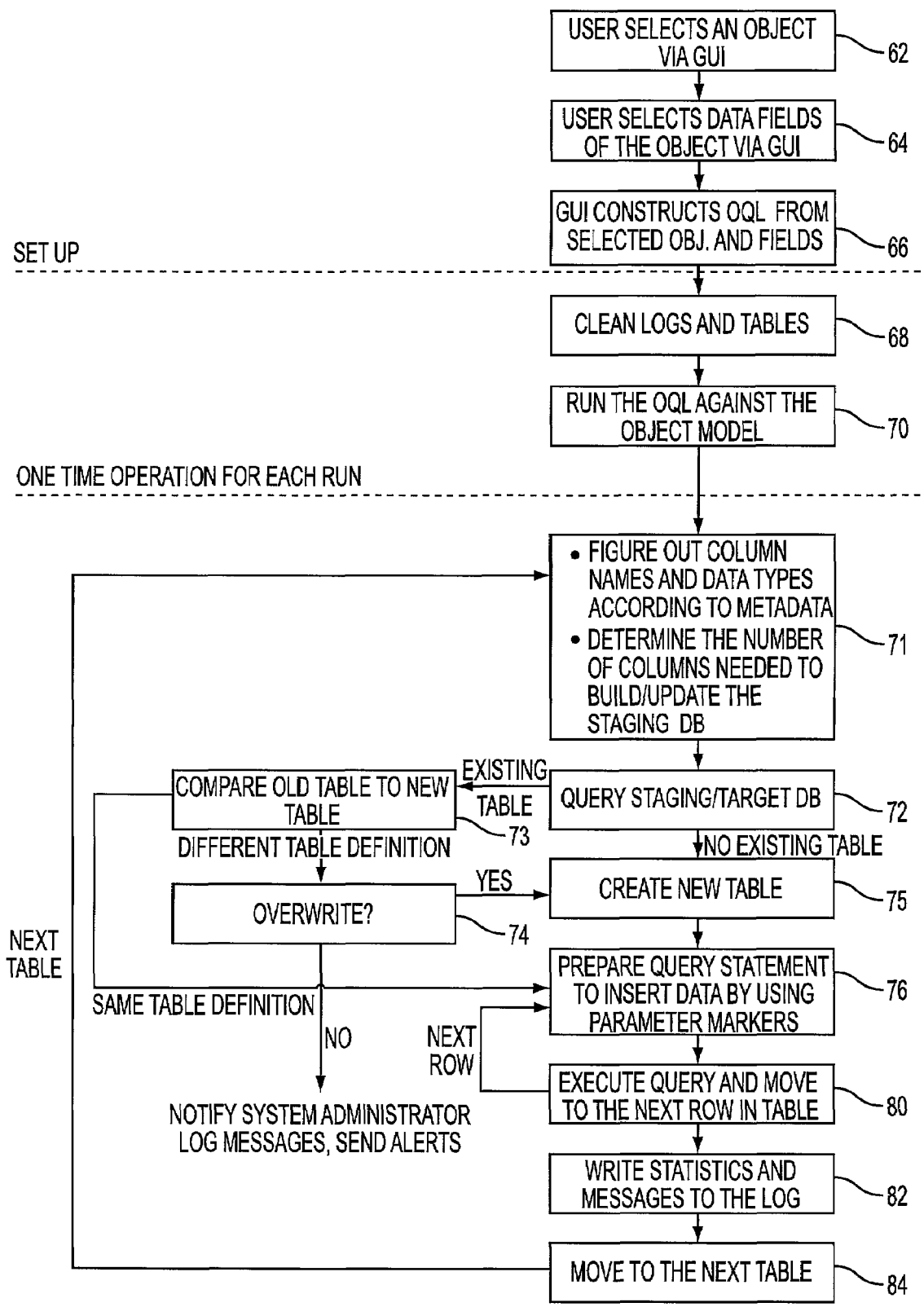
FIG. 4 is a more detailed diagram illustrating the overall process performed by an export engine, according to an embodiment of the present invention.

FIG. 4 is a more detailed diagram illustrating the overall process performed by an export engine, such as export engine 52, according to an embodiment of the present invention. Referring now to FIG. 4, in operation 62, in this example, an end user views a GUI that lists objects that are available in an object model for extraction, and then selects an object via the GUI. After the selection, available fields for the selected object are displayed by the GUI. For example, the end user might select the object "vendors" from a list of objects. The export engine could now construct an appropriate SQL command to indicate that the target table will be called "Vendors." An example SQL command might be as follows:

TargetTable=>Vendors.

Typically, a system administrator would decide what objects and fields are made visible on the GUI.

From operation 62, the process moves to operation 64, where the end user selects data fields for the selected object via the GUI. Assume that the following example fields are selected in operation 64: Version, ACTIVE_TF, AdapterSource, AdapterFlag, PartitionNumber, VendorName, CustomerID, INTERNALVENDORID, VendorIDDomain, VendorIDValue, CorporateURL, StoreFrontURL, Buyer, TransactionCurre, DispatchMethod, Carrier, CarrierMethod, CommonVendor, TermsOfPayment, VendorText, datasource.

The export engine now has all the information it needs to know from the end user and/or system administrator.

From operation 64, the process moves to operation 66, where the GUI constructs OQL queries from the selected object and selected fields. These constructed OQL queries will later be used to extract data from the object model.

From operation 66, the process moves to operation 68, where the export engine cleans the appropriate logs and control tables. In the present embodiment, the export engine keeps track of statistics, error and informational messages in the database (e.g., DW_ETL_LOGS in FIG. 5, which will be discussed further below). Therefore, when a new run starts for a client, the export engine performs house keeping and cleans up such logs (from previous runs), so that the new run starts with a clean slate.

From operation 68, the process moves to operation 70, where the export engine runs the OQL queries constructed in operation 66 against the object model, to thereby extract data from the object model.

From operation 70, the process moves to operation 71, where the export engine figures out column names and data types according to metadata for the extracted data, and determines the number of columns needed to build/update the staging database. Using the column names, data types and number of columns, the export engine creates an appropriate table.

From operation 71, the process moves to operation 72, where the staging database is queried and metadata of the staging database is obtained. If the table does not exist in the staging database, the process moves to operation 75. If the table exists in the staging database, the process moves to operation 73.

In operation 73, the old table definition is compared to the new table definition. If the table has not changed, the process moves to operation 76. If the table has changed, the process moves to operation 74.

In operation 74, a configurable parameter controls the decision on whether the old table is saved and the process moves to operation 75 to create a new table using the new table definition or to notify a system administrator and stop the process for this table.

In operation 75, the export engine creates an appropriate table within the staging database using the column names, data types and number of columns from the extracted data's metadata.

For example, a situation might occur where modifications are made within the object model, and a user has selected to include the modifications into the target database. To accommodate this situation, in operation 72 the export engine checks to determine whether a table for the extracted data already exists. If a table does exist, the process moves to operation 73, where the export engine checks to determine whether the table has changed. For example, the export engine looks at the metadata to identify what is new between extracted data and an existing table within the staging database. If the table has not changed, the process moves to operation 76. If the table has changed, the process moves to operation 75 where the data from the old table can be saved or the old table is deleted based on the parameters controls within operation 74, and a new table is built. A configurable parameter might be used to allow an administrator to enable or disable operation 74, as opposed to requiring the process to be stopped at this point to notify the administrator.

Therefore, via operations 71, 72, 73, 74, 75 and 76, the export engine can delete or save old tables and recreate new tables based on new table definitions, and the existing data can be converted to fit the new table definition automatically. For example, via operations 71, 72, 73, 74, 75 and 76, if a field format within the object model has changed, the export engine can look at the metadata to identify the changes between the extracted data and the existing tables within the staging database, and then convert the existing data to the new format.

The following is an example table, with a table name D_VENDOR, that might be created by the export engine in operation 75:

| | | |
|---|---|---|
| column = 0 | FieldName = VENDORID | FieldClassName = java.lang.String |
| column = 1 | FieldName = Version | FieldClassName = java.lang.Integer |
| column = 2 | FieldName = ACTIVE_TF | FieldClassName = java.lang.Boolean |
| column = 3 | FieldName = AdapterSource | FieldClassName = java.lang.String |
| column = 4 | FieldName = AdapterFlag | FieldClassName = java.lang.Integer |
| column = 5 | FieldName = PartitionNumber | FieldClassName = java.lang.Integer |
| column = 6 | FieldName = VendorName | FieldClassName = java.lang.String |
| column = 7 | FieldName = CustomerID | FieldClassName = java.lang.String |
| column = 8 | FieldName = INTERNALVENDORID | FieldClassName = java.lang.String |
| column = 9 | FieldName = VendorIDDomain | FieldClassName = java.lang.String |
| column = 10 | FieldName = VendorIDValue | FieldClassName = java.lang.String |
| column = 11 | FieldName = CorporateURL | FieldClassName = java.lang.String |
| column = 12 | FieldName = StoreFrontURL | FieldClassName = java.lang.String |
| column = 13 | FieldName = Buyer | FieldClassName = java.lang.String |
| column = 14 | FieldName = TransactionCurrency | FieldClassName = java.lang.String |
| column = 15 | FieldName = DispatchMethod | FieldClassName = java.lang.String |
| column = 16 | FieldName = Carrier | FieldClassName = java.lang.String |
| column = 17 | FieldName = CarrierMethod | FieldClassName = java.lang.String |
| column = 18 | FieldName = CommonVendor | FieldClassName = java.lang.String |
| column = 19 | FieldName = TermsOfPayment | FieldClassName = java.lang.String |
| column = 20 | FieldName = VendorText | FieldClassName = java.lang.String |
| column = 21 | FieldName = datasource | FieldClassName = java.lang.String |

From operation 75, the process moves to operation 76, where, using the information from operation 71, a query statement is prepared to insert the extracted data into the table. In some embodiments, parameter markers are used by the query statement. Parameter markers are place-holders or templates in the insert query that can be used multiple times to create multiple rows in a single table. For the present example, the following is an example SQL query statement that might be used:

```
SQLInsert => INSERT INTO D_VENDORS (VENDORID, Version, ACTIVE_TF,
AdapterSource, AdapterFlag, PartitionNumber, VendorName, CustomerID,
INTERNALVENDORID, VendorIDDomain, VendorIDValue, CorporateURL, StoreFrontURL,
Buyer, TransactionCurrency, Dispatch Method, Carrier, CarrierMethod, CommonVendor,
TermsOfPayment, VendorText, datasource) VALUES(??????????????????????)
```

From operation 76, the process moves to operation 80, where the export engine executes the query and moves to the next row in the table. The export engine already knows the data types for each column from the previous operations. Also, the export engine should have the intelligence of translating the object model data types to the staging database field types. Therefore, the export engine formats the data coming from the object model and writes it to the staging database.

The export engine is staging database aware by querying the staging database in operation 72. Once the export engine knows the database types of the extracted data and the data types associated with the staging database, the export engine can apply the data translation rules to format the extracted data so that it matches the staging database type. For example, if a field from the extracted data has a data type of 'String', the process would check a rule translation table to determine for that object what is the translation rule to the staging or target database. A rule can be, for example, 'Passthrough' which means pass the value without change to the staging database. Another example is if a field from the extracted database is a flag with values of 'Y' or 'N' with an associated translation rule of FlagYNtoBoolean. This rule indicates that if the flag value is 'Y' then translate the value to a Boolean value of '1' and if the flag value is 'N' then translate the value to a Boolean value of '0'. The process would write either '1' or '0' to the associated field in the staging database. Other examples of translation rules are converting decimal numbers to integers, translating date formats . . . etc. There could be many different translation rules including user-defined rules.

From operation 80, the process moves to operation 82, where, if desired, statistics and messages might be written to appropriate logs.

From operation 82, the process moves to operation 84, where the next table is processed.

Of course, the overall process in FIG. 4 is only one example of such a process, and many variations are possible.

Figure 5:
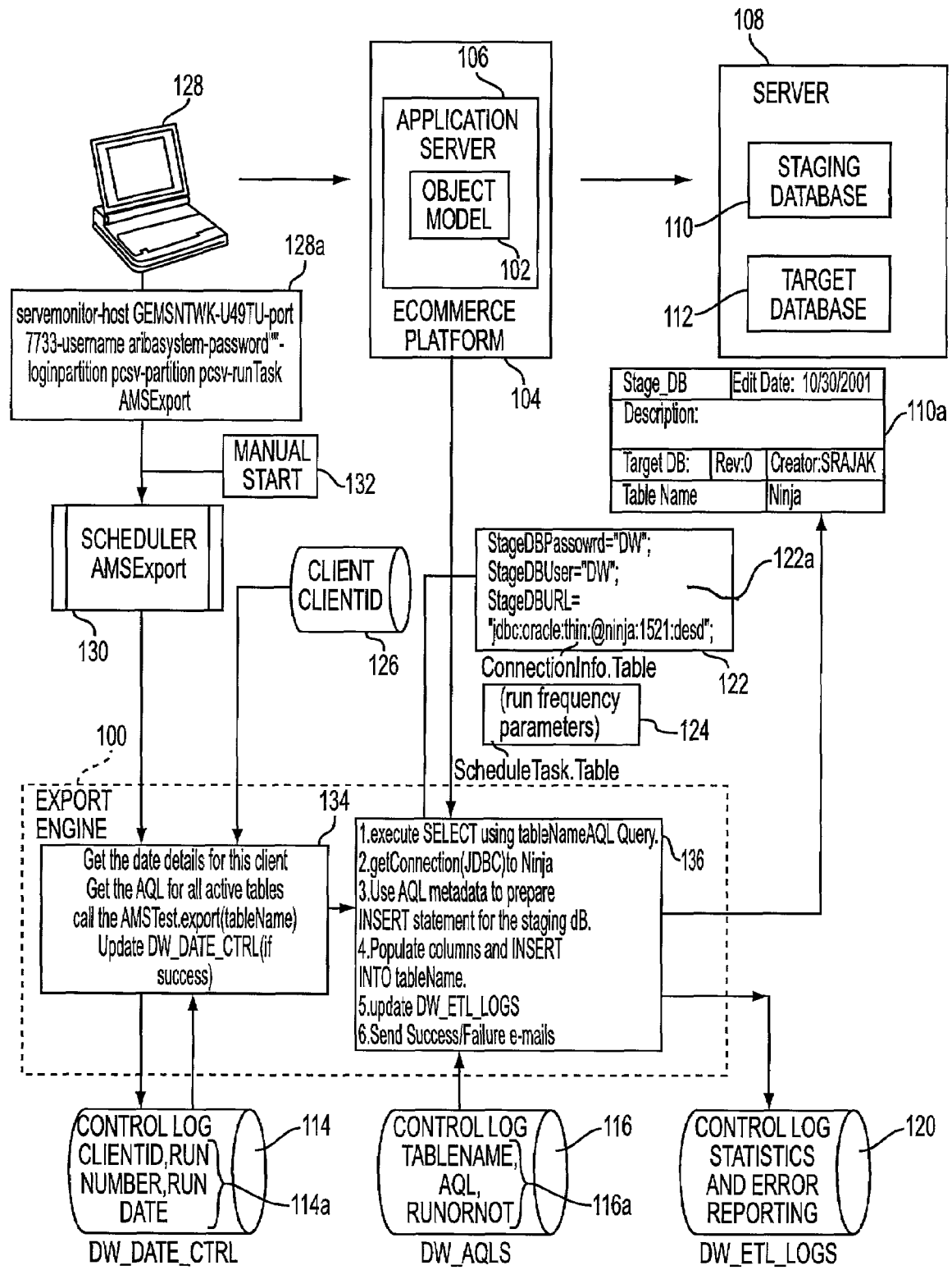
FIG. 5 is a diagram illustrating an example of a detailed hardware/software architecture for a system implementing an export engine, according to an embodiment of the present invention.

FIG. 5 is a diagram illustrating an example of a detailed hardware/software architecture for a system implementing an export engine, according to an embodiment of the present invention. Referring now to FIG. 5, an export engine 100 accesses an object model 102 running on an ecommerce platform 104. For example, ecommerce platform 104 might be ORMS by ARIBA. Object model 102 is shown as being run by an application server 106.

A server 108 is shown running a staging database 110 and a target database 112. Server 108 might be, or include, a database management system for managing staging database 110 and target database 112, and for loading information from staging database 110 to target database 112. However, staging database 110 and target database 112 might be run, for example, by different servers and/or different database management systems. Staging database information 110a is used by export engine 100 to identify staging database 110.

Export engine 100 receives parameters from a control log (DW_DATE_CTRL) 114 and a control log (DW_AQLS) 116. For example, since different clients can access the system, control log (DW_DATE_CTRL) 114 provides information such as the client ID, a run number for this use of the system by the client, and a run date. For example, FIG. 5 shows an example of pseudocode 114a which might be in control log (DW_DATE_CTRL) 114.

Control log (DW_AQLS) 116 provides information obtained from an end user to indicate what information is to be obtained from the object model. For example, FIG. 5 shows an example of pseudocode 116a which might be in control log (DW_AQLS) 116. Pseudocode 116a includes the OQL for exacting the desired information from object model 102. In this example, since ecommerce platform 104 is described as being ORMS by ARIBA, an appropriate OQL for interacting with object model 102 is AQL. Therefore, pseudocode 116a includes the specific AQL needed to obtain the desired information from object model 102. In some embodiments, this specific AQL might be directly written by an end user, system administrator or technical support personnel into control log (DW_AQLS) 116. Alternatively, if a GUI is used as with the embodiment described in FIG. 4, an end user might simply select desired objects and fields from the GUI. Then, as described, for example, in operations 62, 64 and 66 in FIG. 4, the GUI would automatically construct the AQL from the selected objects and fields, and insert the constructed AQL into control table (DW_AQLS) 116.

Export engine 100 provides output to a control log (DW_ETL_LOGS) 120 for statistics and error reporting. For example, for each table, the log might indicate the number of rows created, and errors that were found when data was inserted into the tables. Reported errors might include, for example, that a duplicate row was found, a column name was changed, or that a value that is too large.

A client ID 126 is retrieved from object model 102 to identify the current client, and to identify for whom the current export run should be processed.

A connection table (CONNECTIONINFO.TABLE) 122 shows pseudocode 122a for connecting to staging database 110. A scheduling table (SCHEDULETASK.TABLE) 124 provides run frequency parameters.

In this example, a system administrator 128 can access the system. Pseudocode 128a shows an example of possible pseudocode allowing system administrator 128 to access the system. A scheduler 130, called AMSEXPORT in this example, accesses, for example, scheduling table (SCHEDULETASK.TABLE) 124 to set a schedule for running export engine 100 against object model 102. A manual start 132 might be provided to override scheduler 130.

Export engine 100 executes pseudocode 134 and 136, to thereby extract desired information from object model 102. For example, generally, via pseudocode 134, export engine 100 obtains the required parameters from control log (DW_DATE_CNTL) 114, scheduler 130 and client 126. Generally, via pseudocode 136, export engine 100 applies the AQL from control log (DW_AQLS) 116 to extract desired information from object model 102, builds a table for staging database 110, populates the table with the extracted information, and then provides updates or other information to control log (DW_ETL_LOGS) 120.

The populated table from the staging database is then loaded into target database 112. It is well-known how to load a populated table into a target database.

The specific hardware/software architecture in FIG. 5 is only intended as an example, and many variations are possible. Therefore, the present invention is not limited to this example. For example, the present invention is not limited to the tables and control logs shown in FIG. 5. Moreover, the present invention is not limited to the use of a schedule or manual start shown in FIG. 5. Further, it should be understood that the pseudocode shown in FIG. 5 is only intended as an example and many variations are, of course, possible. Moreover, a person of ordinary skill in the art would readily understand the pseudocode, naming schema of the various tables and databases, and software/hardware architecture shown in FIG. 5.

The present invention is not limited to the use of a single client, a single staging or target database, and a single object model with an export engine. Instead, there might be a plurality of clients, and/or a plurality of object models and/or a plurality of staging and target databases.

Figure 6:
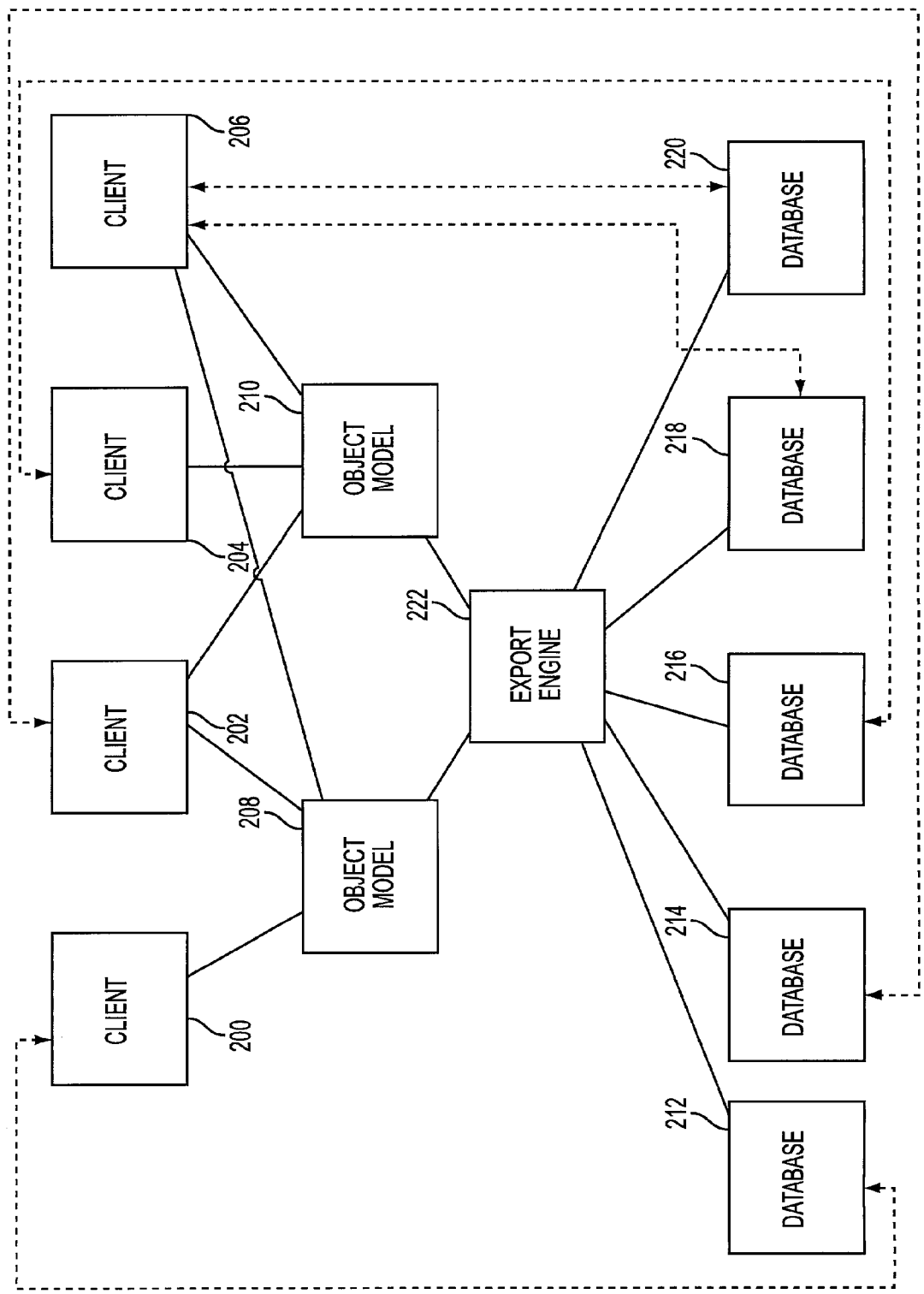
FIG. 6 is a diagram illustrating a system architecture with a plurality of clients and a plurality of object models, according to an embodiment of the present invention.

For example, FIG. 6 is a diagram illustrating a system architecture with a plurality of clients 200, 202, 204 and 206 and a plurality of object models 208 and 210, according to an embodiment of the present invention. Referring now to FIG. 6, client 200 has access to object model 208. Client 202 has access to both object models 208 and 210. Client 204 has access to object model 210. Client 206 has access to object models 208 and 210. Client 200 has access to target database 212. Client 202 has access to target database 214. Client 204 has access to target database 216. Client 206 has access to both target databases 218 and 220. Target databases 212, 214, 216, 218 and 220 are relational databases.

As an example, to build target database 214, client 202 selects one of object models 208 and 210, and identifies information to be extracted (for example, by selecting objects and fields from a GUI). An export engine 222 then automatically extracts data directly from the selected object model 208 or 210, and then automatically builds target database 214.

In some embodiments, a respective client might be able to build two separate target databases based in different data extracted from the same object model. For example, in FIG. 6, export engine 222 automatically extracts a first set of data directly from object model 210, and automatically builds database 218 from the extracted first set of data. Export engine 222 can then automatically extract a second set of data, different from the first set of data, directly from object model 210, and automatically build database 220 from the extracted second set of data.

Further, a respective client might also be able to access different object models, and builds different target databases. For example, in FIG. 6, client 206 can select object model 208. Export engine 222 automatically extracts data from object model 208, and automatically builds database 218. Client 206 then selects object model 210. Export engine 222 automatically extracts data from object model 210, and automatically builds database 220.

Export engine 222 in FIG. 6 can be an export engine such as export engine 52 in FIG. 3, or export engine 100 in FIG. 5, or perform as described in FIG. 2 or 4.

The system architecture in FIG. 6 is only an example of possible architectures, and the present invention is not limited to this example. Instead, there are many combinations of clients, object models and/or databases which can be implemented.

An export engine is described herein as "building" a database, which indicates that the database is newly created or an existing database is updated/modified.

As described above, various processes or operations are performed "automatically." For example, an export engine "automatically" extracts data from an object model, and "automatically" builds a target database from the extracted data. The term "automatically" indicates that a process or operation is performed by a computer in an automated manner without human intervention. All that is necessary is to provide the computer with appropriate control parameters for the process or operation. For example, to extract data, the control parameters identify what data (e.g., what objects and/or fields) are to be extracted, and identify the object model. To build a target database with the extracted data, the control parameters identify the target database. Generally, depending on the system configuration and the process or operation, the control parameters would identify the client, identify the object model, identify the data to be extracted from the object model, and/or identify the target database. As an example, as described herein, an end user simply selects objects and fields to be extracted from a specific object model. The target database and object model are also identified. Therefore, the selected objects, the selected fields, the identification of the object model and the identification of the target database are control parameters provided to the export engine. With these control parameters, and without human intervention, the export engine "automatically" extracts data from the object model and "automatically" builds the target database.

As described above, an export engine "directly" accesses an object model. The term "directly" indicates that the export engine runs off the object model, as opposed to running off the underlying relational database supporting the object model.

As described above, an object model might be an object model for an ecommerce platform. However, the present invention is not limited to the object model being for an "ecommerce" platform. Instead, an object model can be used to model many different types of platforms.

Various query languages, such as SQL and AQL are described herein. However, the present invention is not limited to any specific query language.

Various figures show processes with operations being performed in a particular order. See, for example, the processes in FIGS. 2 and 4. However, the present invention is not limited to these specific processes, or to the performance of the various operations in the specific sequences shown in the figures. For example, some of the operations may possibly be eliminated or performed in a different sequence.

Various examples of pseudocode are provided herein, simply to represent software code which might be implemented. Of course, this pseudocode should only be considered to be an example for explanation purpose. The present invention is not limited to this specific pseudocode or to actual software code implementing this specific pseudocode.

Various of the above embodiments of the present invention describe a staging database as being used in conjunction with a target database. However, the use of a staging database is optional. More specifically, data can be exported by an export engine directly to a target database, instead of indirectly through a staging database. Therefore, the present invention is not limited to the use of a staging database.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method comprising:
selecting object-oriented data in an object model by a user, the selected data being stored in a non-object database by the object model;
automatically extracting the selected data from the non-object database by directly extracting the selected data from the object model using an object query language corresponding to the object model;
automatically building tables for the extracted data in accordance with metadata for the extracted data, the tables being tables for a target relational database;
automatically inserting the extracted data into the tables using a query language corresponding to the tables and which is different from the object query; and
automatically loading the tables with the inserted data into the target relational database.

2. A method as in claim 1, further comprising:
automatically generating queries in the object query language corresponding to the object model, for extracting the selected data.

3. A method comprising:
selecting object-oriented data in an object model by a human user via a graphical user interface (GUI), the selected data being stored in a non-object database by the object model;
automatically constructing commands in an object query language corresponding to the object model to extract the selected data from the object model;
automatically extracting the selected data from the non-object database by directly extracting the selected data from the object model using the constructed commands;
automatically building tables for the extracted data in accordance with metadata for the extracted data, the tables being tables for a target relational database;
automatically inserting the extracted data into the tables using a query language corresponding to the tables and which is different from the object query; and automatically loading the tables with the inserted data into the target relational database.

4. A method comprising:
selecting object-oriented data in an object model by a human user, the selected data being stored in a non-object database by the object model;
extracting the selected data from the non-object database by directly extracting the selected data from the object model by a computer using an object query language corresponding to the object model;
building tables for the extracted data by a computer in accordance with metadata for the extracted data, the tables being tables for a target relational database;
inserting the extracted data into the tables by a computer using a query language corresponding to the tables and which is different from the object query; and
loading the tables with the inserted data into the target relational database by a computer.

5. A method as in claim 4, further comprising:
automatically generating queries in the object query language corresponding to the object model, for extracting the selected data.

6. A method comprising:
selecting object-oriented data in an object model by a human user via a graphical user interface (GUI), the selected data being stored in a non-object database by the object model;

constructing commands by a computer in an object query language corresponding to the object model to extract the selected data from the object model;

extracting the selected data from the non-object database by a computer by directly extracting the selected data from the object model using the constructed commands;

building tables for the extracted data by a computer in accordance with metadata for the extracted data, the tables being tables for a target relational database;

inserting the extracted data into the tables by a computer using a query language corresponding to the tables and which is different from the object query; and automatically loading the tables with the inserted data into the target relational database.

7. An apparatus comprising:

an object model;

a relational database, the object model storing data in the relational database;

a selection device in which a human user selects data to be extracted from the object model and which is stored by the object model in the relational database;

a computer-implemented engine automatically extracting the selected data from the relational database by directly extracting the selected data from the object model via an object query language corresponding to the object model, automatically building relational database tables for the extracted data in accordance with metadata for the extracted data, and automatically inserting the extracted data into the tables using a query language which is different from the object query language; and a database management system loading the tables with the inserted data into the relational database.

8. An apparatus as in claim 7, wherein the selection device is one of a graphical user interface and a control table.

* * * * *